June 23, 1970     A. MILLER     3,517,282
VARIABLE CAPACITANCE TRANSDUCER
Filed Nov. 14, 1968
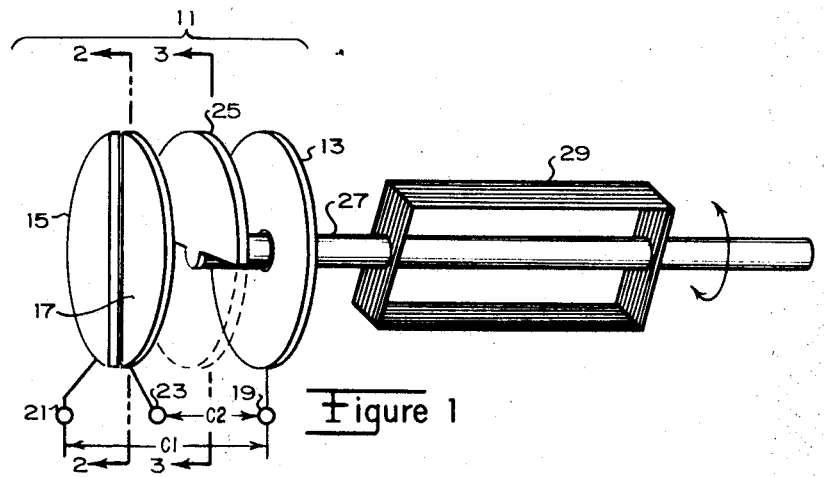
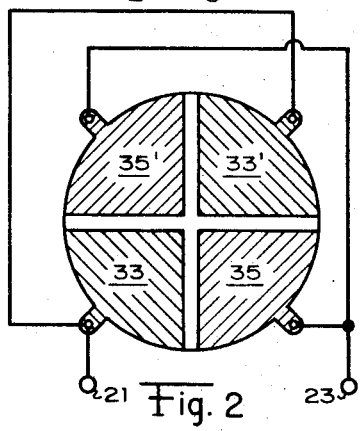
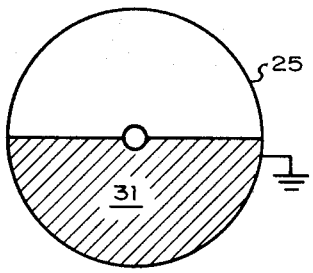
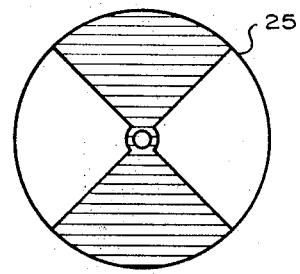
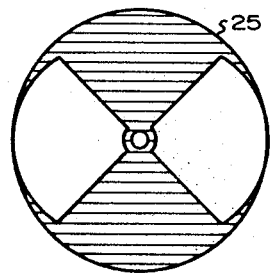
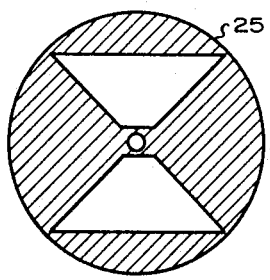
INVENTOR
ARTHUR MILLER
BY *Stephen P. Fox*
AGENT United States Patent Office 3,517,282
Patented June 23, 1970

1

3,517,282
VARIABLE CAPACITANCE TRANSDUCER
Arthur Miller, Chestnut Hill, Mass., assignor to Hewlett-Packard Company, Palo Alto, Calif., a corporation of California
Filed Nov. 14, 1968, Ser. No. 775,799
Int. Cl. H01g 5/26
U.S. Cl. 317—249    2 Claims

ABSTRACT OF THE DISCLOSURE

The stationary plates of a capacitor transducer are spaced apart to define a transducing gap between them. A dielectric plate is disposed in the transducing gap and is rotatable to vary the capacitances between the stationary plates. The capacitances may be varied according to predetermined functions by coating the dielectric plate on selected areas of its surface with a thin metallic shielding material.

BACKGROUND OF THE INVENTION

Variable capacitance transducers are often used to indicate physical displacement. For example, a rotary transducer may be employed in a position feedback system to sense the angular rotation of a shaft which is driven by a meter movement. The variable capacitance may then be incorporated into an A.C. bridge circuit which produces an output signal proportional to shaft displacement.

Typical prior art variable capacitance transducers include a pair of stationary metal plates between which is disposed a movable metal plate. The movable metal plate is generally one of the active electrodes of the transducer, so it is necessary to insulate it from the rotary shaft or other driving means and to provide electrical connection thereto by slip rings or a flexible "pigtail" wire. The output capacitance of such a device is a sensitive function of the spacing between the stationary and movable metal plate electrodes. As a result, costly adherence to critical manufacturing and assembly tolerances is required to insure accurate interelectrode spacing. In the case where a rotatable shaft is used to drive the movable plate, the "end play" of the shaft must be minimized.

It is desirable that a capacitive transducer produce an electrical output having maximum sensitivity to the physical displacement to be measured. Preferably the output may be made to vary with displacement according to certain mathematical laws. Difficulties have been encountered in manufacturing transducers according to these criteria.

Summary of the invention

The variable capacitance transducer of the present invention, in one of the illustrated embodiments, includes a first stationary metal plate electrode, and a second stationary plate means parallel to the first plate and spaced apart therefrom to define a transducing gap therebetween. The second plate means has two or more conductive portions insulated from one another to form electrodes. The capacitance between the first plate and each of the conductive portions of the second plate means is varied by a specially configured third plate interposed in the transducing gap and supported by mechanically movable means such as a rotatable shaft. The third plate is constructed of an electrically non-conducting material having a high dielectric constant. Thus, this plate need not be insulated from the movable support means, and slip ring or "pigtail" connections thereto are not required. Also, the spacing of the third plate in relation to the stationary plates is not critical.

In another embodiment of the invention, the movable dielectric plate is coated on selected areas of its surface

2 with a thin layer of metallic material, which when grounded through the plate drive shaft or other support means, serves to effectively shield the first plate and second plate means from one another. This shielding arrangement produces capacitance changes which are very sensitive to the physical displacement of the movable plate. Additionally, the invention features simplified manufacture and ease of assembly. The uncoated dielectric portion of the movable plate may easily be configured in a variety of patterns for varying capacitance according to predetermined mathematical functions of the displacement of the movable plate.

Brief description of the drawings

FIG. 1 is a perspective view of one embodiment of the variable capacitance transducer of the present invention.

FIG. 2 is a plan view of a different embodiment of a portion of the transducer taken along line 2—2 of FIG. 1.

FIGS. 3a–d are plan views of different embodiments of another portion of the transducer taken along line 3—3 of FIG. 1.

Description of the preferred embodiments

Referring now to FIG. 1, there is shown the capacitance transducer 11 which comprises a first stationary circular metal plate 13 and second stationary metal plate means including two semicircular conductive portions 15 and 17. The plates are disposed parallel to one another in spaced-apart relation to form a transducing gap between them. The first plate is connected to a common input terminal 19 and the two conductive portions 15, 17 of the second plate means are connected respectively to output terminals 21, 23. As shown, a capacitance $C_1$ is developed between terminals 19 and 21, while a capacitance $C_2$ is developed between terminals 19 and 23. These capacitances are varied by a third rotatable semicircular plate 25 positioned in the transducing gap and formed of a nonmetallic electrically insulating material which preferably has a high dielectric constant. The third plate is supported on a drive shaft 27, the angular displacement of which is to be measured. The shaft 27 passes through a central aperture in the first plate 13 and is connected to a source of motive power, such as the drive coil 29 of a galvanometer.

With the semicircular dielectric rotor plate 25 in the position shown, the capacitances between the two plates 15, 17 and the common plate 13 are equal. However, as the dielectric plate 25 rotates in one direction or the other, one of the capacitances $C_1$ or $C_2$ increases, while the other capacitance decreases. The differential change in these capacitances can be measured by incorporating them into an A.C. bridge circuit of the type disclosed in copending U.S. application Ser. No. 777,033 filed Nov. 19, 1968 assigned to the same assignee as the present invention.

It can be seen that any excitation voltage applied to the terminals 19, 21, 23 appears across capacitor plates which do not move. The motion of rotor plate 25 modulates the capacitances $C_1$, $C_2$ between stationary plates; However, these capacitances do not depend on the exact clearance between the rotor plate and the stationary plates. Instead, the capacitances for any given rotor plate position depend only on the dielectric constant and thickness of the rotor plate, and the total air gap between the stationary plates.

Each of the capacitances $C_1$ and $C_2$ is the sum of two components; namely, (1) that due to the dielectric rotor plate 25, and the air dielectric between the rotor plate and the portions of the stationary plates adjacent thereto, and (2) that due to the air dielectric between the stationary plates in the area where the rotor plate is not interposed. The second component varies inversely with the first component when the rotor plate is moved and reduces to some extent the change in capacitance due to the first component for a given displacement of the rotor plate. Thus the effect of the second component is to decrease the output of the transducer.

The overall sensitivity of the transducer is substantially increased when the effect of the above-named second capacitance component is eliminated by shielding the first stationary plate 13 from the conductive portions 15, 17 of the second stationary plate means everywhere except in the area occupied by the semicrcular rotary plate 25. This may be achieved by configuring the plate 25 as shown in FIG. 3a. Specifically, plate 25 is formed of a dielectric material in a circular shape (as indicated by the dashed lines in FIG. 1) and one half of the surface thereof is coated with a thin metallic conducting material 31 which is electrically connected to A.C. ground through the shaft 27. Thus capacitance is reduced to zero in the area of the metal coating and any changes in capacitances $C_1$ and $C_2$ are due solely to the change resulting from the rotation of the dielectric plate 25.

The relationship between the change in capacitances $C_1$, $C_2$ and the angular displacement of plate 25 is dependent on the particular pattern of the shielding coating 31. The pattern of metallization may be applied by any one of a number of methods well known in printed circuit technology.

Another embodiment of the second stationary plate means is shown in FIG. 2. There are provided four electrically conductive quadrants. One pair of opposite quadrants 33 and 33' is connected to the output terminal 21, and the other pair of quadrants 35 and 35' is connected to the output terminal 23. The opposite pairs of quadrants 33, 33' and 35, 35' are electrically insulated from one another.

When the second stationary plate means is configured as shown in FIG. 2, the rotary plate 25 may be coated with a metal conductor in a variety of patterns to modulate the capacitances $C_1$ and $C_2$ as a function of angular displacement of plate 25 according to different mathematical laws. Specifically, FIG. 3b illustrates the dielectric rotor plate 25 covered with a metallic shielding coating in the shaded areas to define a dielectric pattern which causes capacitances $C_1$, $C_2$ to vary linearly with angular displacement. Similarly, FIGS. 3c and 3d respectively illustrate dielectric patterns for causing the capacitances to vary as the sine and tangent functions of angular displacement. It can be seen that a variety of output functions may be obtained simply by replacing one rotor plate with another having thereon a different configuration of metal coating.

I claim:
1. A variable capacitance transducer comprising:
   a first stationary electrically conductive plate connectable to a common output terminal;
   second stationary plate means disposed in spaced-apart, parallel relation to said first plate to define a transducing gap therebetween, said second plate means including at least two electrically conductive portions insulated from one another and symmetrically configured with respect to a common axis, each of said electrically conductive portions being connectable to an output terminal;
   a third plate formed of an electrically nonconducting material having a predetermined dielectric constant and interposed in said transducing gap between said first plate and said second plate means, said third plate being rotatable on said common axis into adjacent relationship with different areas of said second plate means for differentially changing the capacitance between said first plate and said electrically conductive portions of said second plate means, said third plate including grounded metallic shielding means coated on selected areas thereof for substantially eliminating capacitive effects between the portions of said first plate and said second plate means adjacent to said selected areas, wherein only the uncoated dielectric areas of said third plate contribute to the capacitance between said first plate and said second plate means.

2. The transducer of claim 1, wherein the uncoated areas of said third plate define triangular shaped dielectric patterns for varying the capacitances between said first plate and said second plate means in accordance with the tangent function of the angular displacement of said third plate.

References Cited
UNITED STATES PATENTS

| | | | |
|---|---|---|---|
| 2,461,832 | 2/1949 | Meacham | 317—253 X |
| 2,480,187 | 8/1949 | Gamertsfelter | 317—249 X |
| 2,745,993 | 5/1956 | Foster | 317—249 |
| 2,719,192 | 8/1955 | Rex | 317—249 X |
| 3,253,207 | 5/1966 | Zauch | 317—253 X |
| 3,306,104 | 2/1967 | Corcoran | 317—249 X |

E. A. GOLDBERG, Primary Examiner

U.S. Cl. X.R.

317—250, 254